United States Patent
Yamamoto

(10) Patent No.: US 6,703,054 B2
(45) Date of Patent: Mar. 9, 2004

(54) METHOD FOR TREATING ORGANIC WASTE

(75) Inventor: Masahiro Yamamoto, 1103 Seaside Mansion, 26-1 Kamoike-Shinmachi, Kagoshima-shi, Kagoshima-ken, 890-0064 (JP)

(73) Assignees: Masahiro Yamamoto, Kagoshima-ken (JP); Noriko Yamamoto, Kagoshima-ken (JP)

( * ) Notice: Subject to any disclaimer, the term of this patent is extended or adjusted under 35 U.S.C. 154(b) by 0 days.

(21) Appl. No.: 10/135,784

(22) Filed: Apr. 30, 2002

(65) Prior Publication Data

US 2003/0012847 A1 Jan. 16, 2003

(30) Foreign Application Priority Data

May 11, 2001 (JP) ........................ 2001-142103
Feb. 21, 2002 (JP) ........................ 2002-045463

(51) Int. Cl.⁷ .................. A23K 1/06; A23K 1/10; A23K 1/16
(52) U.S. Cl. ............... 426/7; 426/52; 426/53; 426/56; 426/60; 426/807
(58) Field of Search ............... 426/7, 52, 53, 426/56, 60, 807

(56) References Cited

U.S. PATENT DOCUMENTS

| 3,272,633 A | 9/1966 | Clickner |
| 5,707,856 A | 1/1998 | Higa |

FOREIGN PATENT DOCUMENTS

| EP | 357 320 | 3/1990 |
| EP | 1 174 041 A1 | 1/2002 |
| EP | 1 256 282 A | 11/2002 |
| GB | 1 489 592 | 11/1977 |
| JP | 74 027 790 | 7/1974 |
| JP | 53 069 178 A | 6/1978 |
| JP | 53 086 377 A | 7/1978 |
| JP | 57-071370 | 5/1982 |
| JP | 58-190356 | 11/1983 |
| JP | 60-260489 | 12/1985 |
| JP | 62179352 | * 8/1987 |
| JP | 64-020090 | 1/1989 |
| JP | 04-131047 | 5/1992 |
| JP | 07-075563 | 3/1995 |
| JP | 08-000181 | 1/1996 |
| JP | 2000-259985 | 8/2000 |
| WO | WO 00/67588 | 11/2000 |

OTHER PUBLICATIONS

Database WPI Section Ch, Week 198223 Derwent Publications Ltd., London, GB; AN 1982–47163E XP002209123-& JP 57 071370 A (KAI H), May 4, 1982.
Patent Abstracts of Japan vol. 012, No. 028 (C–471), Jan. 27, 1988–& JP 62 179353 A (Shuzo Nakazono;Others:03), Aug. 6, 1987.
Patent Abstracts of Japan vol. 013, No. 575 (C–667), Dec. 19, 1989–& JP 01 240148 A (Shuzo Nakazono), Sep. 25, 1989.
Database WPI Section Ch, Week 199520 Derwent Publications Ltd., London, GB; AN 1995–151476 XP002143775-& JP 07 075563 A (Ohisa N), Mar. 20, 1995.

* cited by examiner

Primary Examiner—C. Sayala
(74) Attorney, Agent, or Firm—Pearne & Gordon LLP

(57) ABSTRACT

The invention has the object of offering a novel means for making effective use of organic wastes, and offering a method for producing a feed by efficiently treating organic wastes. The invention has the additional object of enabling highly concentrated organic wastes to be treated efficiently in a short time. In a treatment method where molds are mixed with organic wastes to ferment and dry, the oil content of the mixture is adjusted to at least 3 wt %, preferably at least 5 wt %, more preferably at least 10 wt %.

30 Claims, 1 Drawing Sheet

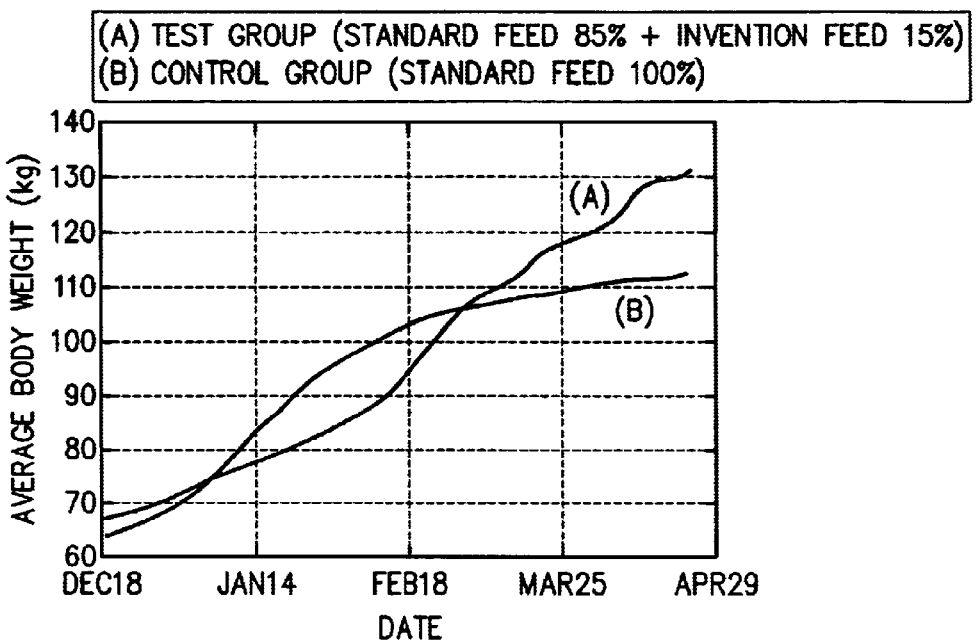
FIG. 1 RESULTS OF EXPERIMENT ON SWINE FED FEED MADE FROM FOOD SCRAPS
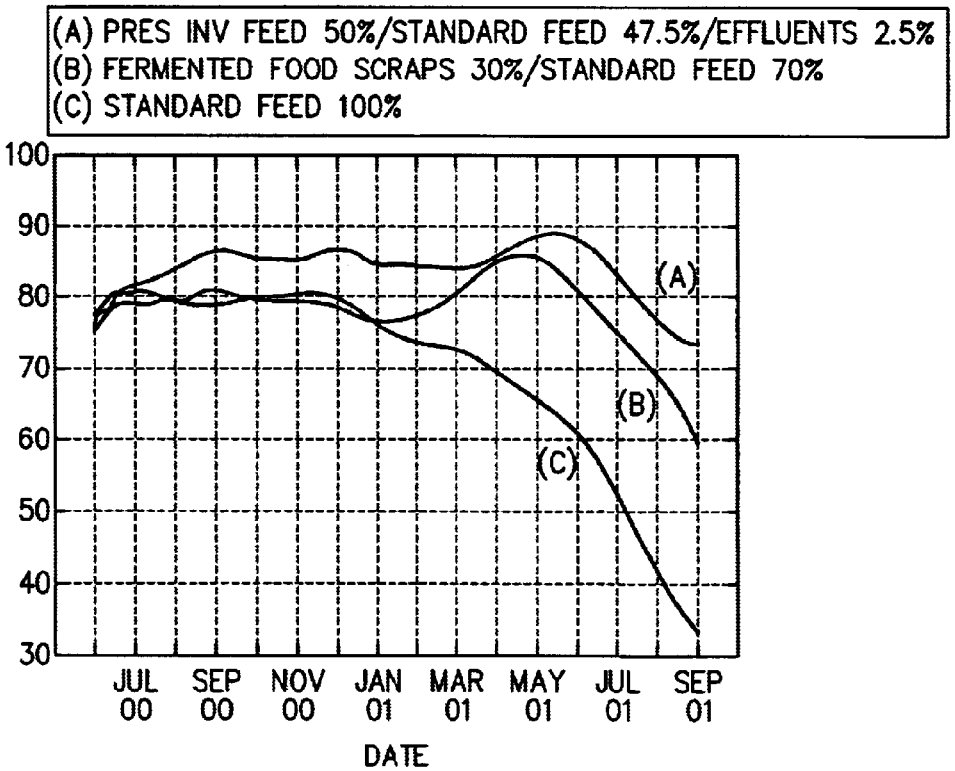
FIG. 2 CHANGE IN EGG-LAYING RATES FROM JUNE 2000 TO SEPTEMBER 2002

METHOD FOR TREATING ORGANIC WASTE

BACKGROUND OF THE INVENTION

The present invention relates to a novel method for treating organic wastes, and more specifically relates to a method for producing a feed by using organic wastes and oils as the raw materials to form a koji-fermented feed.

Additionally, the present invention relates to a method for treating highly concentrated organic wastes with a BOD of at least 10,000 ppm such as sake lees and food scraps, and further relates to a crude fiber feed comprising a ligneous matrix obtained by treatment with the above-described treatment method.

In recent years, the problem of how to treat waste from the food processing industry or highly concentrated organic waste such as food scraps has become one which has bearings on the public health. This is because they contain large amounts of water and are perishable, generating malodorous fumes in the process. While this type of waste is usually simply discarded, the burial of these substances results in their decay in the soil, producing large amounts of nitrate-nitrogen which can contaminate ground water. Additionally, if incinerated, they can generate dioxins and NOX, which can pollute the atmosphere. Moreover, the amount of such organic waste is increasing annually at an alarming pace.

Therefore, many methods of fermenting organic waste to make fertilizer or methods for treating waste for decomposition in order to enable larger amounts of waste to be collected and recycled have been proposed in recent years, but with conventional methods, the treatments can take months, and their utility has been limited due to the risk of saline pollution when used in large amounts because of the salt content in the resulting fertilizers. Furthermore, such waste often has a high water content, making storage and transport difficult. As a result, this type of waste has not been able to be used effectively.

On the other hand, there are methods for making such raw garbage into fertilizer using microbes, but such microbes are not very compatible with garbage having a high oil content, so that there are limits to the range of raw waste that can be treated in this manner.

BRIEF SUMMARY OF THE INVENTION

The present invention has been made in consideration of the above-described circumstances, and has a first object of offering a novel means for making effective use of the above-described organic wastes.

The present invention has the further object of offering a method for producing a feed by efficiently processing the above-described organic wastes.

The present invention also has the object of offering a feed produced by the above method.

The second object of the present invention is to offer a method for treating organic wastes such as sake lees and food scraps, especially highly concentrated organic wastes with a BOD of at least 10,000 ppm, with extreme efficiency in a short period of time.

Another object of the present invention is to offer a method for treating an organic waste capable of converting a large amount of waste into a readily disposable form, and use of a substances treated in this way.

As a result of diligent research towards achieving these objects, the present applicant discovered that if oils are added when treating organic waste with certain molds, the molds can transform the oils into fuel and efficiently convert them into the heat of fermentation. That is, they found that by employing oils as energy sources for the molds to dramatically improve the decomposition and drying speed of the organic matter due to the mold, it is possible to efficiently treat organic wastes. Additionally, more surprisingly, they discovered that when ammonia gas and acetic acid are generated, the generation thereof can be prevented by mixing in some oils, that is, the addition of oils can inhibit the proliferation of putrefying bacteria such as acetic bacteria.

The present invention offers a method for treating organic wastes, comprising steps of mixing said organic wastes with a mold to obtain a mixture, and allowing said mixture to ferment and dry, wherein the oil content of said mixture is at least 2 wt %, preferably at least 5 wt %, more preferably at least 10 wt % with respect to the water content of said mixture. In this way, the heat of fermentation of the mold can be used to efficiently dry the wastes.

According to a first object of the present invention, a feed is produced by adjusting the oil content of a mixture of organic wastes and koji mold or koji to at least 3 wt %, preferably at least 5 wt %, more preferably at least 10 wt %, and allowing said mixture to ferment and dry. Preferably, the feed is produced by mixing together organic wastes, oils, koji mold or koji, and allowing the koji mold to ferment and dry the waste.

By adding oils as nutrients in this way, the processing speed of organic wastes, in particular highly concentrated organic wastes can be highly improved.

Furthermore, according to this type of method, raw garbage, livestock excrement and the like which has conventionally been discarded can be effectively used.

Furthermore, since the method of the present invention makes use of koji mold instead of treatments using high temperature microbes, so that while a portion of the organic matter is decomposed into carbon dioxide and water, the most part is synthesized into microbial proteins, while large amounts of digestive enzymes are secreted for digestive consumption. As a result, a feed of high nutritional value which is suitable for feeding to livestock and the like is obtained. That is, while the treatment of organic waste by microbes has conventionally been for the purpose of breaking down wastes, the method according to the present invention enables the generation of active ingredients by the koji mold, thereby changing the organic waste into feed which can then be put to effective use.

In the present invention, oils are used in order to produce a feed fermented by koji mold from organic wastes. Conventionally, the fermentation and heat generation due to koji mold has been mainly used for decomposition of starches, but in the present invention, the oils are used to assist largely in the fermentation and heat generation. Since the koji mold can consume the oils and efficiently convert them to the heat of fermentation, there is no particular need to add nutrients for growth of the koji mold, and the oils act as an energy source to dramatically increase the speed of decomposition and drying of the wastes. Therefore, there is no need to specially add starchy materials even to wastes such as raw garbage with a low starch equivalent. Furthermore, since there are few microbes that can consume oils in nature, the koji mold, which is relatively susceptible to contamination with other microbes, can be grown with dominance. The adjustment of the oil content should preferably be done by intermixing oils, the amount of oils normally added being preferably at least 1.5 wt %, more preferably at least 5 wt %, and most preferably at least 10 wt % of the water content of the mixed organic waste.

The oils used in the present invention can be of any type as long as they are able to achieve the object of the present invention, and can be chosen from among animal, vegetable or mineral oils, or combinations thereof. Some examples are those which are readily available, including edible oils such as frying oil, lard, soy oil, waste oil from meat processing or olive oil, or cutting oils, with those having a boiling point of at least 100° C. being most preferable. When preparing a feed, edible oils are preferable.

Additionally, the mold in the present invention refers to filamentous eukaryotic microbes (molds), particularly Aspergillus, Monascus, Mucor and Rhizopus, of which Aspergillus and/or Monascus are chosen with preference for having amylase and lipase activity, further among which *Aspergillus oryzze kawachii* and *Aspergillus awamori kawachii* (available from Kirishima Kogen Beer KK) have a high oil-decomposing ability and can be used effectively. Normally, oils are avoided due to the inability of conventional fertilizer plants to process them. However, by using this type of koji mold, which has a high oil decomposing ability, a waste with a high oil content can be effectively treated. Additionally, they can be used in combination with other molds which can suitably assist in the decomposition process.

According to a second object of the present invention, an organic waste and oils are preferably added to a matrix material to form a mixture, and a mold is grown in the mixture to treat the organic waste by fermentation thereof.

In this case, the organic waste should preferably be provided in an amount such that the water content is 20–70 wt %, preferably 20–40 wt % with respect to the matrix material.

Additionally, the matrix material used in the treatment method of the present invention can be of any type as long as it is capable of achieving the object of the present invention, but should preferably be a pulverized ligneous material. For example, sawdust, wood shavings, and their mixtures are suitable for use.

Additionally, the mold can be allowed to occur naturally in the mixture, or positively added to the mixture. The amount added should be in the range of about 0.01% to 0.1% of the total dry weight of the mixture.

According to the present invention, the treatment process is usually a continuous process such that as the organic waste is being treated, new batches of the organic waste and oils can be added as needed. Here, the matrix material can also be supplemented if necessary.

In the processing method according to the present invention, the mixture is preferably adjusted to 50° C. or less, preferably about 40–50° C. This temperature regulation should preferably be performed by ventilation, and it is especially convenient to blow warm dry air which is available from the exhaust heat from the generator of the ventilator.

Additionally, once the koji mold begins to grow and fermentation begins, the heat of fermentation causes the waste to dry so as to result in a feed with a water content below a desired level, and this can be improved by making proper adjustments to the speed and level of drying due to the ventilation of warm air. The final water content of the feed should preferably be about 30 wt % or less, preferably 20 wt % or less, and most preferably about 15 wt % or less.

Furthermore, in the present invention, a feed obtained by the above-described processing method is offered. This feed has an extremely high nutritional value, and is suitable for feeding to livestock such as cattle, swine and fowl. Furthermore, when using a matrix material, a matrix material obtained by treating organic waste can be used as a crude fibrous feed. Since the koji mold uses oils as an energy source, the oils are consumed and reduced. Moreover, the feed will contain lipases from the koji mold. While oils can cause diarrhea in livestock, this problem can be completely overcome due to the presence of lipases, so that the oils can actually be used to raise the nutritional value of the feed and promote the growth of the livestock. Furthermore, the action of the koji mold also leaves large amounts of other enzymes such as amylase, protease and active oxygen-decomposing enzymes in the feed, which can then largely assist in digestion by livestock to which the feed has been fed, thereby relieving stress. Additionally, it also has the effect of suppressing the foul odor of livestock excrement.

Furthermore, while livestock fed feeds containing unsaturated fatty acids can have reduced meat quality due to yellowing or the like, treatment with koji mold reduces the amount of unsaturated fatty acids, thus giving the livestock fed the feed of the present invention good meat quality.

BRIEF DESCRIPTION OF THE DRAWINGS

FIG. 1 is a graph showing the change in body weight of pigs fed (A) a feed which is a mixture of the feed of the present invention and a standard feed, and (B) only a standard feed.

FIG. 2 is a graph showing the change in the egg laying rate of chickens fed (A) a feed which is a mixture of the feed of the present invention and a standard feed, (B) a feed which is a mixture of koji-fermented food scraps without any added oils and a standard feed, and (C) only a standard feed.

DETAILED DESCRIPTION OF THE INVENTION

Herebelow, preferred embodiments of the present invention shall be described.

In a preferred embodiment for achieving the first object, a method for treating an organic waste by mixing with mold to ferment and dry includes the step of adjusting the oil content of the mixture so as to become at least 3 wt %, preferably 5 wt %, more preferably 10 wt % with respect to the water content of the mixture.

In a preferred embodiment for achieving the second object, a method for treating an organic waste involves adding an organic waste and oils to a matrix material to form a mixture, then growing mold in the mixture for fermentation thereof.

First, with regard to the organic wastes that can be used as the raw material in the present method, this can be, for example, raw garbage, waste from food processing, waste from livestock breeding, raw sewage and waste from quarantine stations. Additional examples include highly concentrated organic wastes with BOD (biological oxygen demand) exceeding 10,000 ppm, such as sake lees, juice pulp, food scraps, beer dregs, tofu lees, the distillatory effluents of distilled spirits, excrement and the like, these substances having a water content of at least 50% and being perishable. The type of waste can be arbitrarily selected, and can be used alone or as a mixture of any of these. These wastes are rich in amino acids, which raises their nutritional value as feeds.

Raw garbage includes, for example, cooking scraps and leftovers from restaurants or households.

Food processing waste includes, for example, waste from meat processing, distillatory effluents and waste from seafood processing, particularly fish broth and fish viscera from seafood processing, which are separated and removed from fish and conventionally discarded during the processed seafood production process, but is not restricted to these portions. The low-melting point unsaturated fatty acids contained in processed seafood are highly regarded as growth promoting factors, and these can be put to effective use.

Livestock breeding waste includes, for example, all types of waste generated in the breeding of livestock as well as carcasses.

Additionally, the raw sewage used can be excrement from livestock such as cattle, horses and fowl which is generated in the livestock industry, or the excrement of other animals as well as humans.

The waste should preferably be sterilized by steaming or the like in order to improve their preservability and safety.

Next, the oil content is adjusted depending on the type of waste. The oil content is normally added simply by adding oils in the case of waste other than raw garbage or the like which contains large amounts of oil.

Here, the oils used may be of any type which is available and appropriate to eat, including fryer oils, lard, soy oil, waste oils from meat processing factories or olive oil. This is because koji mold secretes lipases which decompose oils that are insoluble in water so as to become water-soluble fatty acids, which can then be accepted into the mold cells and used, thus being capable of decomposing both vegetable and animal oils. Additionally, as is well-known, the waste oils, in the form of industrial waste, are coming to be recognized as a pollution problem, but by using the above oils as waste oils, this problem might be able to be effectively resolved.

The oil content should be adjusted so as to be, in the final mixture, at least 3 wt %, preferably at least 5 wt %, more preferably at least 10 wt % with respect to the water content. The amount of oils added should be at least 1.5 wt %, preferably at least 5 wt %, more preferably at least 10 wt % with respect to the water content of the mixture.

The method of fermentation by the koji mold to obtain a feed may be of any conventionally known method. For example, there is a method of a) adding koji mold or koji to an organic waste with adjusted oil content and mixing well, and b) putting the koji-containing material in a static ventilated koji-producing apparatus, continually stirring while holding at approximately 30–50° C. to ferment and lower the water content to about 20 wt % or less to obtain a feed, or further c) mixing in more material to make the water content of the mixture about 20–35 wt % and further fermenting and drying, and repeating the steps b) and c) to obtain a feed with a water content of about 20% or less.

In step a), the water content of the mixture should preferably be about 50% or less, and more preferably about 25–40%. The water content of the material can be adjusted by any method, such as by mixing in other waste which is relatively dry, sawdust, wood shavings, wheat bran, rice bran and barley bran, beet pulp, hay, or a dry koji-containing feed produced by the above method, or by drying naturally, by hot air ventilation or in the sun to reduce the water content. It is also possible to combine two or more of the above-given methods. On the other hand, the water content may also be raised by adding vegetable scraps, water or the like. Thus, the waster content of the waste of the present invention is not restricted.

After introduction of the koji mold, the action of the koji mold will generate heat, thus gradually raising the product temperature.

Subsequently, it should preferably be kept at about 35–50° C. in an isothermic tank, with cooling by aeration being effective. Additionally, ventilation with air heated to 50–60° C. is more effective for drying.

When the koji mold begins to ferment, the moisture evaporates due to the heat of fermentation. Therefore, the water content of the feed can be adjusted as needed. The final water content of the feed should be 30 wt % or less, preferably 20 wt % or less, and more preferably 15 wt % or less. If the water content of the feed exceeds 30 wt %, the overall amount becomes high, making storage and transport difficult. Additionally, it becomes less suited to long-term storage, becoming vulnerable to decay. The dried waste becomes directly capable of being utilized as a feed.

Additionally, when the water content of the obtained feed needs to be further reduced, it may be dried using hot air from a steam heater or the like.

Furthermore, when the water content has decreased, preferably when the water content is about 20%, the water content can be adjusted to about 30% by adding and stirring in a material with a high water content, and this can be repeated for a number of stages.

The matrix material may be of any type including fibrous materials and starch materials, examples of which include sawdust, wood shavings, beet pulp, hay, wheat bran, rice bran and barley bran. Particularly suitable are sawdust and wood shavings. Here, the proportion of the matrix material with respect to the amount of the organic waste should be adjusted so that after mixing, the water content of the mixture is 20–70 wt %, preferably 20–40 wt %.

While waste has been treated using koji mold in the past, wheat bran has, for example, been used as a matrix. However, while the surface area used for growing koji mold is extremely large in the case of wheat bran and large amounts of oxygen are needed for such growth, wheat bran itself is soft so that gaps can be closed off under the weight of the wheat bran itself, thus causing poor ventilation and making it extremely difficult to supply enough of the oxygen that is required. In contrast, in the case of ligneous matrix materials such as sawdust used in the present treatment method, the specific gravity is extremely low at 0.25 as compared with the specific gravity 0.5 of wheat bran, so that although the surface area on which the koji mold is grown becomes even larger, the material itself is relatively hard, and the proportion which is compressed by weight during the koji producing process is extremely small, the spaces are passable throughout all steps, and large amounts of oxygen which are needed for growth of the koji mold and the like can be supplied.

Additionally, koji mold is especially suited to being the mold used in the treatment method of the present invention. This may be that produced from koji as is normally used, or may be in combination with other types of molds or the like. The seed koji can be in the form of fermented rice bran or seed koji can be added directly. Conventionally, high-temperature microbes have been used for treating highly concentrated organic wastes such as food scraps. These high-temperature microbes usually are active at 60° C. or higher, and burn extremely large number of calories, which has been considered to be more effective. However, the high-temperature microbes lose heat by evaporation due to the ventilation that is thought to be required for fermentation, so that the product temperature can drop dramatically to considerably below the optimum temperature for fermentation. In contrast, although koji mold does indeed have a comparatively low fermentation temperature of more or less 40° C., the overall caloric intake can become higher than that of high-temperature microbes if enough oxygen is supplied. That is, while aeration is performed during fermentation (e.g. when fermenting 1 ton of koji, 10 m$^3$ of air is required every minute), but if this is performed on high-temperature microbes, heat is lost due to evaporation, and the temperature can dip below the optimum fermentation temperature. As a result, the overall processing speed of koji mold is actually faster than that of high-temperature microbes.

Furthermore, koji mold can grow in a water content of about 20–70 wt % in a ligneous matrix material. In particular, if 50% or less, the moisture activity can be held to below 0.9, thus inhibiting the proliferation of microbes. In this regard, koji mold can be grown with low moisture activity of less than 0.9. Additionally, since the resin has an antiseptic function in a ligneous matrix such as cedar or cypress, the growth of microbes can be suppressed, thus leaving the koji mold unaffected by growth inhibiting factors.

Furthermore, in order to grow intermediate temperature microbes such as koji mold capable of being used as fermenting microbes, sterilization of the culture medium has conventionally been required in order to remove toxic microbes and the like. Such sterilization can also result in the elimination of useful microbes. However, since those microbes which are capable of secreting large amounts of lipases will be more well-equipped to survive than such toxic microbes in the extremely limited environment of a ligneous material and oils, there is no need for sterilization, and the interaction of microbes such as Mucor and Rhizopus will further accelerate the speed of treatment.

Additionally, while the odor of ammonia and the like which is generated during decomposition of proteins in the decomposition of organic matter using bacteria has been considered to be a source of secondary pollution, and an odor preventing device usually must be installed, the treatment using koji mold and the like has the advantage of generating absolutely no malodorous fumes such as ammonia.

The above-described mold does not necessarily have to be added to the mixture beforehand. This is due to the fact that in the treatment method of the present invention, the culture medium is composed of fibrous materials and oils, and therefore has extremely limited nutritional content, so that microbes other than molds are less likely to be able to grow, and given enough time, molds, in particular koji mold, will begin to grow naturally.

This being said, it is of course possible to treat the organic waste in a shorter time if the mold is added. Therefore, mold spores are usually added. At this time, the amount added is roughly 0.01% to 0.1% of the overall weight. Here, the added amount is the weight together with the wheat bran which is the koji mold growing matrix. At least 0.01% is required in order to achieve a significant increase in the processing speed, while on the other hand, the processing speed will not significantly increase even if more than 0.1% is added. Optimally, about 0.05% of the overall weight should be added.

Here, the mold growth rate can be made faster by further adding a small amount of starchy material such as wheat bran or the like. While the growth rate will become faster as the added amount is increased, the risk of decay will increase in inverse proportion thereto, so that about 10% is an appropriate amount.

As for the oils added in the above-described method, the use in particular of waste oils allows the organic waste and waste oils to be treated simultaneously. That is, koji molds and the like secrete lipases, which enable them to decompose even oils which are insoluble in water to become water-soluble fatty acids, which can then be incorporated into the cell. Therefore, they are able to decompose even the discarded oils from food processing and used cutting oils, and this has been confirmed by the applicant.

The above-described oils should be added in an amount of at least 3 wt %, preferably at least 5 wt % of the organic wastes added as nutritional components for the koji mold or the like.

After adding koji mold and letting stand for 40 hours, the koji mold is sufficiently and predominantly grown. The koji mold will then expend the energy from the oils to release heat of fermentation. If this temperature is adjusted to 50° C. or less, preferable 40–50° C. by suitably dissipating by ventilation, then the water content will dry from 50% to about 20% in roughly 24 hours, the organic materials decomposing into carbon dioxide and water. Thus, by adding organic wastes on a daily basis, they can be dried and thereby eliminated.

The ligneous matrix which is finally treated in the above manner can be effectively utilized as a crude fiber feed for cattle, as long as an edible oil is used as the added oil. That is, the crude fibrous feeds currently used in Japan are extremely expensive when comparing the average feed prices, and moreover, pulverized ligneous mater has heretofore not been able to be adequately utilized as a feed due to such reasons as 1) not meeting the tastes of cattle so that they will not eat it, and 2) disturbing the microbe layer in the lumens of the cattle due to the antiseptic effect of the resins contained in the ligneous material. However, the crude fibrous feed composed of a ligneous matrix obtained by the treatment method of the present invention has koji mold or the like growing on the surface, which was to the cattle's liking. Furthermore, since the resins are consumed by the koji mold, no changes were observed in the state of health of the internal organs of the cattle. That is, the use of koji on cedar and cypress chips which were not able to be effectively used until now has resulted in a useful crude fibrous feed.

When treating organic wastes by the above-described methods, the principal expense is the cost of electrical power for the ventilators used for ventilation. This cost is extremely low as compared with the case of other treatment methods such as dumping into the sea or forced drying by means of fire or the like.

Additionally, the ventilation is performed by ventilation cooling while inverter-controlling a turbofan with electrical power from a microturbine, but if the air which is blown is made into hot dry air by thermal exchange of the heat from the microturbine with the outside air, then evaporative heat will be taken from moisture contained in the koji mold without raising the product temperature of the koji mold, thus enabling the product temperature of the koji mold to be held within a predetermined range by minimal blowing.

EXAMPLES

Herebelow, examples of the present invention shall be described in detail. It will be understood that these examples are not such as to limit the scope of the claimed invention in any way.

Example 1

50 liters of liquor effluents, 30 liters of cutting oil and 100 g of seed koji were mixed into 100 kg of wood shavings and well-stirred. At this time, the water content was about 35%. This was placed in a container with good warmth retaining properties, and let stand at room temperature of 30° C. Then, heat began to be generated after 12 hours, so that the product temperature rose from 35° C. to 40° C. Subsequently, the product temperature was controlled so as to retain a temperature of 50° C. or less while appropriately ventilating.

40 hours after the addition of the koji, the heat had somewhat receded, and the water content fell to about 25% or less. Upon adding 70 liters of liquor effluents, the water content became about 50%, and the heat generation once again became more active 30 minutes after addition thereof, so that the ventilation was resumed to control the product temperature to 50° C. or less.

After 24 hours, the heat had subsided, and the water content from the liquor effluent had mostly evaporated, so as to make the water content 25% or less.

Thereafter, these operations were repeated daily, whereby 70 liters of the liquor effluent were able to be processed each day practically to perpetuity. When the heat became weak, it was found that the heat generation immediately resumed with the addition of new waste oils. Additionally, 3.5 liters of waste oils were sufficient to treat 70 liters of liquor effluents.

Example 2

50 liters of liquor effluents, 30 liters of frying oil and 100 g of seed koji were mixed into 100 kg of wood shavings and well-stirred. At this time, the water content was about 35%. This was placed in a container with good warmth retaining properties, and let stand at room temperature of 30° C. Then, heat began to be generated after 12 hours, so that the product temperature rose from 35° C. to 40° C. Subsequently, the product temperature was controlled so as to retain a temperature of 50° C. or less while appropriately ventilating.

40 hours after the addition of the koji, the heat had somewhat receded, and the water content fell to about 25% or less. Upon adding 70 liters of liquor effluents, the water content became about 50%, and the heat generation once again became more active 30 minutes after addition thereof, so that the ventilation was resumed to control the product temperature to 50° C. or less.

After 24 hours, the heat had subsided, and the water content from the liquor effluent had mostly evaporated, so as to make the water content 25% or less.

Thereafter, these operations were repeated daily, whereby 70 liters of the liquor effluent were able to be processed each day practically to perpetuity. When the heat became weak, it was found that the heat generation immediately resumed with the addition of new waste oils. Additionally, 3.5 liters of waste oils were sufficient to treat 70 liters of liquor effluents.

Example 3

Upon giving a ligneous matrix (koji) treated as in Example 2 to cattle as feed, it was found to be highly to their liking. Additionally, no changes were observed in the state of health of the cattle's internal organs, and they also had no diarrhea.

Example 4

In order to observe whether koji mold had grown dominantly in the materials treated under the present invention, a general microbe test was performed on the materials treated in Example 2, and as a control, water was sprayed on wheat bran to adjust the water content to 35%, seed koji was added, and this was ventilated for 3 days, after which the number of microbes was measured for making the comparison. The results are shown in the following table.

TABLE 1

| Matrix | No. Microbes |
| --- | --- |
| Ligneous Non-steamed Koji | $3 \times 10^6$ |
| Wheat Bran Non-steamed Koji | $1.5 \times 10^{10}$ |

From these results, the method of the present invention is clearly capable of largely suppressing the proliferation of common microbes even without sterilization.

Furthermore, in order to confirm how much koji mold has grown on these treated materials, the saccharification ability of each was measured. The measuring method was one wherein an extract was taken and filtered as an enzyme solution from 15 g of a sample were using biological saline solution, a starch solution was added thereto at 30° C., and the amount of glucose produced after 1 hour and after 2 hours was measured and taken as the saccharification enzyme value. The results are shown in the following table.

TABLE 2

| | Saccharification | |
| --- | --- | --- |
| Matrix | 1 hr | 2 hrs |
| Ligneous Non-steamed Koji | 17.67 | 24.59 |
| Wheat Bran Non-steamed Koji | 0 | 0 |

These results clearly indicate that koji mold is growing with dominance in the materials processed according to the present invention.

Example 5

A mixture of 6 tons of wheat bran with 3 tons of liquor effluents was steam-sterilized, then cooled to 40° C. At this time, the water content was about 36%. 4 kg of seed koji were mixed therein to form a koji. After 72 hours, the water content was about 17% or less. Upon adding 1 ton of liquor effluents and 100 liters of waste oil thereto, the water content became about 30%, and ventilation was appropriately performed to control the product temperature to 40–50° C. or less. 24 hours after addition, the water content of the liquor effluent had mostly evaporated, and had lowered to less than 17%. Additionally, at this time, one part could be taken as feed, and an equivalent amount of wheat bran (or rice bran) added.

Thereafter, this operation can be repeated daily to continually treat 1 ton of liquor effluents daily practically in perpetuity.

Example 6

10 liters of frying oil were added to 100 kg of fowl droppings with a water content of 36%, and after mixing, the result steam-sterilized. Next, 100 g of seed koji were added and well-mixed. The raw material mixture with the koji mold adequately mixed therein was introduced to a static ventilation koji producing apparatus. With the growth of the koji mold, heat generation began about 12 hours after mixing in the koji mold. In order to control the heat to a suitable temperature (30–50° C.), ventilation was appropriately performed. Upon the passage of 17–30 hours after beginning koji production, the growth of the koji mold became most active, with the temperature of the mixture rising to 45° C. The koji production was further continued, and ventilation was performed through a steam heater in order to achieve more efficient drying. As a result, 64 kg of a fermented product (feed) with a water content of 10% was obtained 48 hours after koji production.

Example 7

10 liters of frying oil were added and mixed with 100 kg of raw garbage from a restaurant with the water content adjusted to 40%. Next, 20 g of seed koji were added and mixed well. The raw material mixture with the koji mold adequately mixed therein was introduced to a static ventilation koji producing apparatus. With the growth of the koji mold, heat generation began about 12 hours after mixing in the koji mold. In order to control the heat to a suitable temperature (30–50° C.), ventilation was appropriately performed. Upon the passage of 17–30 hours after beginning koji production, the growth of the koji mold became most active, with the temperature of the mixture rising to 45° C. The koji production was further continued, and ventilation was performed through a steam heater in order to achieve more efficient drying. As a result, 22 kg of a fermented product (feed) with a water content of 10% was obtained 48 hours after koji production.

Example 8

100 kg of raw garbage from a restaurant was mixed with 10 liters of frying oil. This was stirred together with 600 kg of wheat bran koji with a water content of 15%, after which the water content became 25%. 30 minutes later, the heat generated by the koji mold became very active, and ventilation was suitably performed to hold the product temperature to 40° C., so that 24 hours after beginning koji production, 615 kg of a koji feed with a water content of 15% was obtained.

Example 9

The feed material of Example 2 was mixed in a proportional amount of 15% with a conventional standard feed, this was fed to swine, and the results compared with swine fed only the standard feed. The growth result data are shown in FIG. 1. As is clear from this data, swine fed on a diet containing the present feed in an amount of 15% in addition to the conventional standard feeds exhibited a body weight increase of 20%.

Example 10

Additionally, an example of feeding to egg-laying fowl is shown in FIG. 2. The graph shows the egg-laying rates of (A) fowl fed a mixture of the feed of the present invention with a standard feed, (B) fowl fed a mixture of a standard feed with a koji-fermented feed produced without mixing in oils, and (C) fowl fed only a standard feed. The data clearly show that whereas the egg-laying rates of normal egg-laying fowl drop a year after beginning to lay eggs, those fed feed containing the feed of the present invention in an amount of 50% stably maintained a high egg-laying rate for well over a year, and the effect was found to be greater, as the proportional amount of the feed material of the present invention was increased.

Example 11

266 g of steam-sterilized garbage were mixed with 500 g of wheat bran koji, to make the water content 35.4%. 25 g of food oils were admixed thereto. The oil content was then 7.2%. Since the product temperature rose immediately after mixing, ventilation was performed as appropriate and the product temperature was maintained at 40° C. or less. After 24 hours, 507.7 g of a koji feed with a water content of 14% and an oil content of 8.1% was obtained.

Immediately after mixing the garbage and the waste oils, the oil content in the koji was 7.2%, which after 24 hours had changed to 81%. In pure quantitative terms, this means that the oil content immediately after mixing was $(500+291) \times 7.2\% = 57$ g. On the other hand, the oil content had been reduced after 24 hours to $507.7 \times 8.1\% = 41$ g. During this time, the water content fell from $766 \times 35.5\% = 271$ ml to $507.7 \times 14\% = 71$ ml. That is, while $271 - 71 = 200$ ml of water was evaporated, $57 - 41 = 16$ g of waste oil were consumed. That is, in order to evaporate 200 ml of water with the heat of fermentation of the koji, waste oil must be present in a proportion of 8% of the water content, i.e. 16 g.

Furthermore, while the iodine value of the waste oil prior to koji production was 265, the iodine value of the oil contained after 24 hours of koji production had fallen to 151. This suggests that the unsaturated fatty acids in the waste oil had been largely decomposed by the action of the koji mold.

As is clear from the above examples, while conventional feed materials made from raw garbage are only adequate simply as substitutes for normal feed, the feed of the present invention has the remarkable effect of greatly exceeding the capabilities of conventional feeds.

What is claimed is:

1. A method for treating organic wastes, comprising steps of mixing said organic wastes with a mold to obtain a mixture, and allowing said mixture to ferment and dry, wherein the oil content of said mixture is at least 10 wt % with respect to a water content of said mixture, wherein the mixture is dried by heat of fermentation by said mold.

2. A method in accordance with claim 1, wherein the treatment comprises production of a feed.

3. A method in accordance with either claim 1 or 2, wherein said mold is koji mold or is added in the form of koji.

4. A method in accordance with claim 2, wherein said feed contains lipases from koji.

5. A method in accordance with claim 1, wherein said organic wastes comprise raw garbage.

6. A method in accordance with claim 1, wherein said organic wastes comprise at least one type of waste chosen from the group consisting of excrement, wastes from the seafood industry and distillatory effluents.

7. A method in accordance with claim 2, wherein said feed is dried to a water content of 30 wt % or less.

8. A method in accordance with claim 1, wherein a purpose of the treatment is to eliminate the organic wastes.

9. A method in accordance with claim 8, further comprising a step of adding a matrix material to the organic wastes to form a mixture.

10. A method for treating organic wastes, comprising steps of mixing a matrix material into said organic wastes, adjusting the oil content of said mixture so as to be at least 10 wt % with respect to the water content of said mixture, allowing koji mold to form naturally thereon, and allowing said mixture to ferment and dry.

11. A method in accordance with either claim 9 or 10, wherein said matrix material is a fibrous material.

12. A method in accordance with claim 11, wherein said fibrous material is sawdust, wood shavings or a mixture thereof.

13. A method in accordance with either claim 9 or 10, wherein said matrix material is a starchy material.

14. A method in accordance with claim 11, wherein a starchy material is further added.

15. A method in accordance with claim 8, wherein said organic wastes are highly concentrated organic wastes with a BOD of at least 10,000 ppm, and having a water content of at least 50%.

16. A method in accordance with claim 8, wherein said organic wastes are wastes chosen from among the group consisting of sakes lees, juice pulp, food scraps, beer dregs, distillatory effluents of distilled liquors, tofu lees and livestock excreta.

17. A method in accordance with claim 1, wherein said step of mixing said organic waste with a mold comprises adding a matrix containing the mold spores in an amount of 0.01% to 0.1% with respect to the total dry weight of the mixture.

18. A method in accordance with claim 1, wherein said oil content is adjusted by adding oils.

19. A method in accordance with claim 18, wherein the amount of said oils which are added is at least 10 wt % of the water content of said mixture.

20. A method in accordance with claim 18, wherein said oils comprise a waste oil.

21. A method in accordance with claim 18, wherein said oils comprise edible oils.

22. A method in accordance with claim 18, wherein said oils comprise cutting oils.

23. A fibrous feed comprising a matrix obtained by treating organic wastes by a method in accordance with claim 18, using edible oils as the added oils.

24. A method in accordance with claim 1, wherein organic wastes and oils are continually added afresh in the course of treatment of the organic wastes.

25. A method in accordance with claim 1, wherein said organic wastes are added in an amount such that the overall water content is 20–70 wt %.

26. A method in accordance with claim 1, wherein the mold is allowed to grow by adjusting the temperature to 50° C. or less.

27. A method in accordance with claim 26, wherein the temperature is adjusted by ventilation.

28. A method in accordance with claim 27, wherein the exhausted heat from a generator used to power a ventilator is used to blow hot air for drying.

29. A method in accordance with claim 1, wherein said mold is chosen from the group consisting of Aspergillus, Monascus, Mucor and Rhizopus.

30. A feed obtained by a method in accordance with claim 2.

\* \* \* \* \*